United States Patent [19]

Liff

[11] 4,376,446

[45] Mar. 15, 1983

[54] VENT VALVE FOR FUEL TANKS AND THE LIKE

[75] Inventor: Benjamin S. Liff, West Hartford, Conn.

[73] Assignee: Kaman Aerospace Corporation, Bloomfield, Conn.

[21] Appl. No.: 886,808

[22] Filed: Mar. 15, 1978

[51] Int. Cl.³ .............................................. F16K 17/02
[52] U.S. Cl. ..................................... 137/202; 137/450
[58] Field of Search ........................ 137/202, 196, 450

[56] References Cited

U.S. PATENT DOCUMENTS

| | | | |
|---|---|---|---|
| 3,162,209 | 12/1964 | Gaines | 137/450 X |
| 3,860,026 | 1/1975 | Hendrik | 137/202 |
| 4,014,362 | 3/1977 | O'Neil | 137/196 |

FOREIGN PATENT DOCUMENTS 2845 of 1914 United Kingdom ................ 137/202

Primary Examiner—Alan Cohan
Attorney, Agent, or Firm—McCormick, Paulding & Huber

[57] ABSTRACT

A vent valve for venting fuel and other such tanks includes a float having a valve closure poppet for opening and closing the valve at a predetermined liquid level in the tank. The valve also has a bellows actuator which relieves excessive internal tank pressures by holding the closure poppet open in opposition to buoyant forces on the float when the excessive pressures are encountered. The bellows actuator and the valve poppet are self-compensating since higher internal tank pressures cause the actuator to increase the valve opening for greater pressure relief.

16 Claims, 4 Drawing Figures

VENT VALVE FOR FUEL TANKS AND THE LIKE

BACKGROUND OF THE INVENTION

The present invention resides in a vent valve that is used in fuel tanks and the like to permit air to pass freely in or out of the tank without losing the confined liquid. More particularly, the present invention is concerned with a vent valve that in addition to the venting function also relieves excessive internal pressure when other vent valves would normally remain closed.

Fuel vent valves of the prior art have certain inherent problems. Pivoted or overhung valves used in aircraft are attitude sensitive, and can leak large amounts of fuel under certain combinations of pitch, roll and valve orientation within the craft. Direct-acting valves have a tendency to be pulled closed at high fueling rates due to rapidly escaping air and often do not reopen until internal tank pressures have dropped considerably below atmospheric pressure. Both types of prior art valves are used with a separate relief valve to bleed off excess pressures generated by thermal expansion within the tank after the tanks have been topped off, or to protect the tanks and surrounding structure against excess pressures when a component in the automatic fuel shutoff equipment fails and the tank is overfilled. A further problem that arises in tanks having both vent and relief valves is that the relief valve cannot discriminate between fuel and air and may spew out fuel rather than air under certain conditions.

It is, accordingly, a general object of the present invention to provide a vent valve that integrates relief valve functions and which is self-compensating to provide greater pressure relief with greater internal tank pressures. It is a further object of the invention to provide a vent valve that is stable in its transition from a venting to a closed position and which is highly sensitive to internal tank pressures.

SUMMARY OF THE INVENTION

The present invention resides in a vent valve for fuel tanks and the like and comprises a valve integrating both venting and pressure relief functions.

The valve has a fluid conduit with a first end that is located or positioned within a tank and a second end outside of the tank. A fluid passageway formed by the conduit extends between the first and second ends for passage of fluids between the interior and exterior of the tank during venting and pressure relieving functions.

Closure means are provided in association with the fluid conduit and normally respond to the liquid level within the tank to perform the venting function. The closure means include a closure element that is movable from a first position in which the passageway in the fluid conduit is open for venting, and a second position in which the passageway is closed. The element is moved from the first to the second position by liquid in the tank as the liquid approaches a predetermined level. In a preferred embodiment of the invention, the closure element forms a portion of a float that senses liquid level in the tank and moves the element to the closed position when the liquid has reached a predetermined fill level.

Pressure relief means are integrated into the valve and respond to excessive pressures within the tank. The relief means is operatively associated with the closure means and displaces the closure element from the second position to open the fluid passageway in the presence of internal tank pressures above a selected level. In a preferred embodiment, the pressure relief means comprises a bellows actuator that is situated within the tank and mechanically engages the closure element when pressure relief is necessary.

The vent valve with integrated pressure relief features is capable of distinguishing between liquid or air in the tank and thus prevents liquid from being spewed out of the tank and polluting the environment when venting internal air. The valve is more sensitive to low internal pressures which permits higher fill or shutoff levels. At the same time self-compensating features of the valve, which produce greater valve openings with greater internal pressures, permit greater quantities of fuel to be handled and prevent the valve from being drawn shut prematurely as the fill level is reached.

DESCRIPTION OF THE PREFERRED EMBODIMENTS

Figure 1:
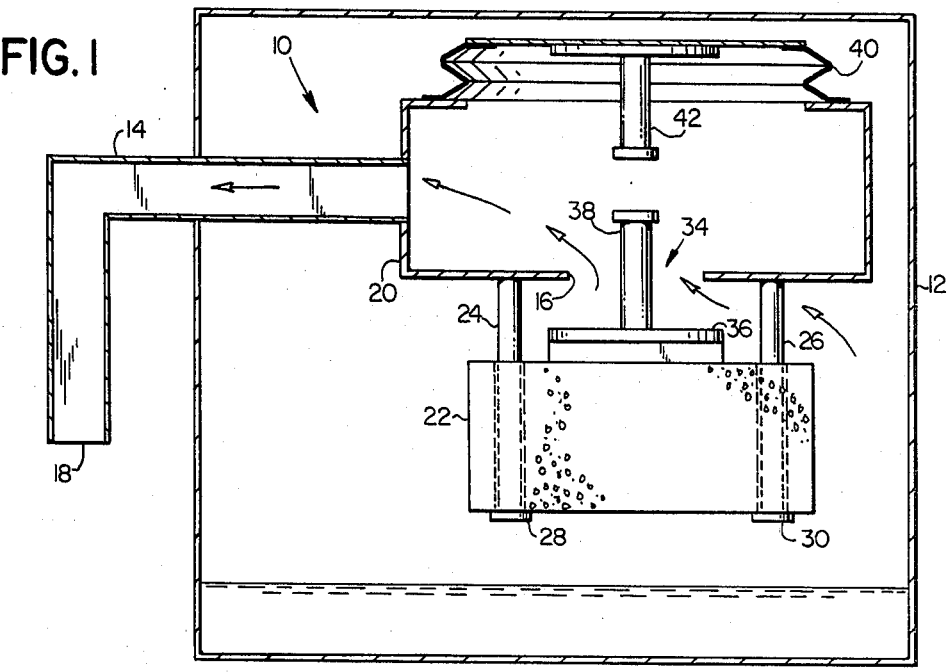
FIG. 1 illustrates the vent valve of the present invention within a fuel tank with the valve open and performing its venting function.

FIG. 1 illustrates the vent valve, generally designated 10, of the present invention installed within a fuel tank 12. While a fuel tank has been chosen as the typical environment of the valve, it should be understood that the vent valve may be used in other tanks where venting and pressure relief functions are desired.

The vent valve 10 includes a fluid conduit 14 that extends through one wall of the tank 12 and defines the housing of a fluid passageway between an inner aperture 16 within the tank and an outer opening 18 outside of the tank. At an inner portion, the conduit 14 has a venting chamber 20 which defines part of the fluid passageway adjacent to the inner aperture 16 and which supports venting and pressure relieving components.

A liquid level float 22 having a substantially fixed or uniform buoyancy is suspended in the tank 12 from the chamber 20 by means of a pair of vertically oriented guideposts 24 and 26. The guideposts extend loosely through corresponding channels in the float so that the float can move freely up and down over the posts relative to the aperture 16 with changes in the fuel level irrespective of changes in the tank attitude. Enlarged heads 28 and 30 at the depending ends of the posts 24 and 26 respectively capture the float on the posts and define the lower limit of float movement relative to the chamber.

A valve closure poppet 34 is formed by the upper part of the float and is comprised by a seating element or disc 36 and an operating rod 38. The seating disc 36 is larger than the venting aperture 16 in the chamber 20 and closes the aperture when fuel or other liquid in the tank 12 has risen to a predetermined fill level and lifted the float 22 to the position illustrated in FIG. 3.

Figure 2:
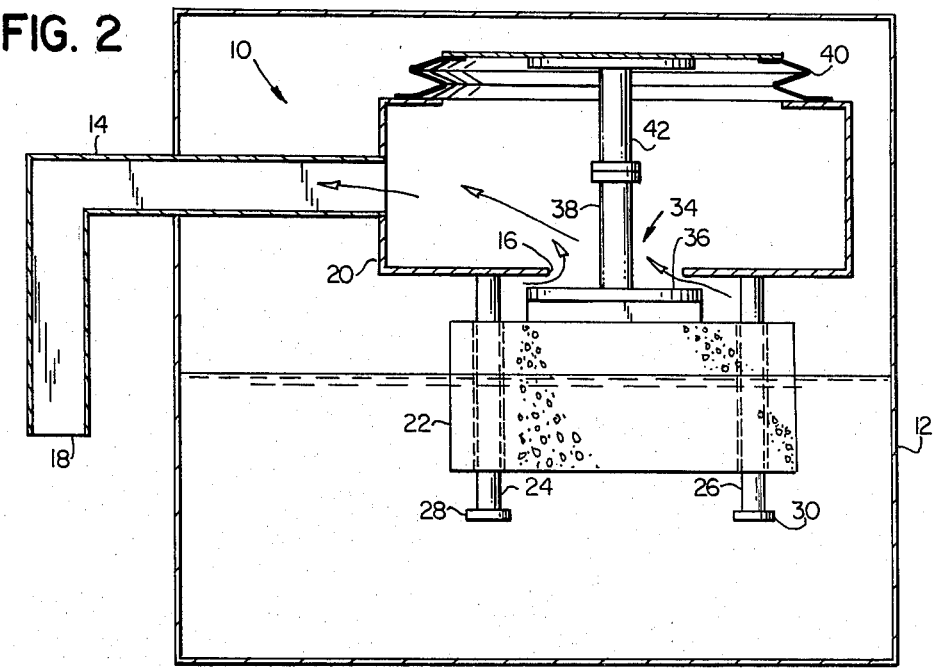
FIG. 2 illustrates the vent valve when the valve poppet is about to close during fueling due to the fuel reaching the fill level within the tank.

Thus, when fuel is sitting in the tank as in FIG. 1 and is being consumed, for example, by an aircraft engine, the vent valve 10 is open and the conduit 14 allows air in the environment surrounding the tank to pass inwardly through the conduit 14 and chamber 20 and fill the ullage space above the fuel. During a fueling operation the float 22 initially rests on the heads 28 and 30 of the posts 24 and 26 well above the fuel, and air displaced by the rising fuel level is vented outwardly through the chamber 20 and the conduit 14 as illustrated by the arrows in FIGS. 1 and 2. When the tank is nearly full as shown in FIG. 2, the fuel approaches the fill level and lifts the valve float 22 and the poppet 34 upwardly to place the seating element 36 in sealing relationship with the chamber at the aperture 16. Before the valve poppet 34 closes, air rushing through the restriction formed by the poppet and the aperture 16 creates an increased pressure drop across the restriction which tends to suck the poppet shut prematurely. In the prior art valves a premature closing would result in tank overpressurization which could either actuate the relief valves with subsequent fuel spillage overboard or in cases where automatic fueling equipment is automatically shut down due to excessive internal tank pressure, the tank would not be filled to capacity.

To prevent the valve poppet 34 from being drawn closed as the fuel reaches the level shown in FIG. 2, a bellows actuator 40 is connected to the upper side of the chamber 20 and includes an actuating rod 42 extending downwardly into the chamber toward the operating rod 38 of the valve poppet 34. The bellows actuator is responsive to internal tank pressures that exist within the ullage space above the fuel and is preferably formed by an elastomeric bellows which is highly sensitive to pressure changes. Furthermore, the elastomeric material is leak proof and can easily be sealed to the chamber 20 without a friction-generating seal around the operating rod 42. The actuator 40 being responsive to slight changes in pressure within the tank produces movement or displacement which is directly proportional to such pressure changes.

With the poppet 34 of the valve 10 in the position shown in FIG. 2, the restriction in the venting passageway raises the air pressure within the tank, and the bellows actuator 40 responding to such pressure is compressed as shown so that the actuating rod 42 pushes downwardly against the partially raised float and engages the operating rod 38 to hold the valve 10 open without instability. In this respect the actuator and poppet are self-compensating because the larger the air pressure in the tank, the greater the actuator force and the larger the opening at the poppet through which the pressure is relieved. Also, since the actuator responds to air pressure and the float responds to the fuel, the valve 10 discriminates between fuel and air to open and close the fluid conduit 14 for venting without polluting the environment with fuel.

As the fuel level continues to rise and the air pressure within the tank is relieved through the conduit 14, the forces on the float 22 eventually overcome the actuator forces, and the poppet 34 closes the aperture 16. The valve 10 is then in the position shown in FIG. 3 with the fuel at the predetermined fill level of the tank. Fuel cannot escape through the conduit 14 with the seating element 36 closing the aperture 16, and the air pressure within the ullage space of the tank is at permissible levels which relax the bellows actuator 40 and hold the rod 42 out of engagement with the operating rod 38.

Figure 3:
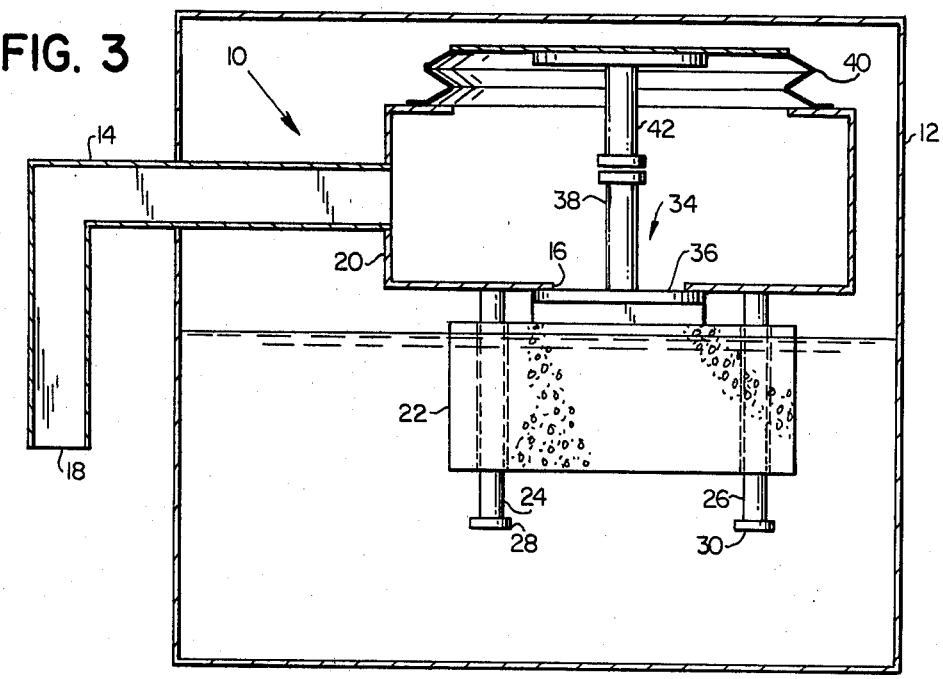
FIG. 3 illustrates the vent valve in its closed position with fuel at the fill level.

If the fueling equipment fails to automatically shutoff when the fuel level reaches its predetermined level and the vent valve closes, or if for some other reason such as thermal expansion, the fuel level rises above the predetermined fill level illustrated in FIG. 3, the bellows actuator 40 responds to the increased tank pressures which develop in the ullage space and relieves those pressures as before by opening the valve poppet 34 and allowing the fuel and air to be discharged from the tank through the fluid conduit 14.

Figure 4:
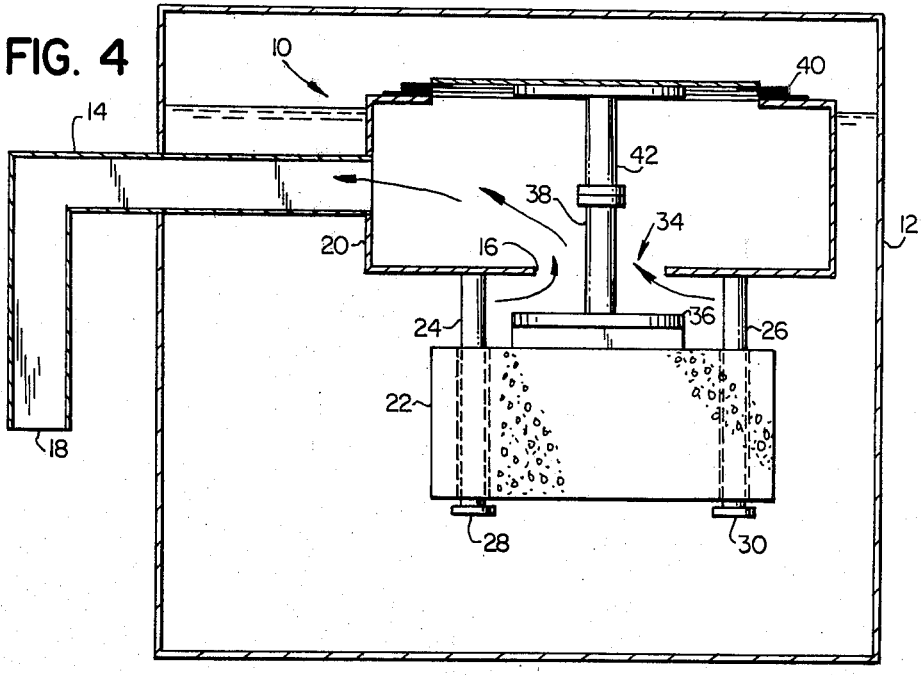
FIG. 4 illustrates the vent valve opened and performing its pressure relieving function due to a rise in the fuel level above the predetermined fill level shown in FIG. 3.

FIG. 4 illustrates the pressure relieving function. As pressure within the tank increases above a selected level due to excess fuel, the bellows gradually collapses and the actuating rod 42 engages the operating rod 38 and pushes the float 22 downwardly in opposition to the buoyant forces which closed the valve so that the element 36 is unseated. Fuel and air then pass outwardly through the conduit 14, as shown by the arrows, until the pressure level within the ullage space again returns to a safe level and the bellows actuator 40 assumes its relaxed position shown in FIG. 3. Again, it will be observed that the greater the pressure within the tank, the larger the opening at aperture 16 through which fuel and air will pass. Thus, the valve is self-compensating in its relieving function as well as its venting function.

While the present invention has been described in a preferred embodiment, it should be understood that numerous modifications and substitutions can be had without departing from the spirit of the invention. For example, while the seating element 36 is shown as a part of the float 22, it is not essential to have the float and the seating element integrally formed. The float may be located remotely of the valve poppet with suitable interconnections to actuate the poppet as the predetermined fill level is reached in the tank. Also, the float and valve poppet may take other forms and may be supported or captured within the vent conduit 14 by cages and other structures. Additionally, other pressure responsive actuators than a bellows may be utilized to displace the valve poppet when it is necessary to relieve excess pressures within the tank. The bellows is a desirable actuator because of its high sensitivity to pressures and the fact that it can easily be sealed to the venting conduit with a frictionless mechanical connection directly to the valve poppet. Accordingly, the present invention has been disclosed in a preferred embodiment by way of illustration rather than limitation.

I claim:
1. A vent valve for a fuel tank and the like for performing both venting and pressure relieving functions comprising:
a valve housing defining inlet and exit openings in fluid communication through an internal fluid passageway for venting fluids in a tank through the passageway from the inlet opening to the exit opening;
movable closure means associated with the valve housing for closing the fluid passageway and preventing fluid flow through the valve housing between the inlet and exit openings, the closure means including a float having a substantially fixed buoyancy and movable relative to the valve housing by buoyant forces of liquid in the tank, the float having upper and lower positions established by the liquid level in the tank and in the upper position causing the closure means to close the fluid passageway and the tank, and in the lower position causing the closure means to open the fluid passageway and freely vent the tank; and pressure responsive actuating means responsive to the pressure in the tank above the liquid in both the open and closed positions of the passageway and operatively associated with the movable closure means at the upper position of the float for opposing closure of the fluid paassageway by the float at tank pressures above a preselected level and depressing the float from the upper position in opposition to the buoyant forces of the liquid to open the fluid passageway and relieve pressures within the tank.

2. A vent valve for fuel tanks and the like as defined in claim 1 wherein the movable closure means comprises a movable closure element having a first position closing the fluid passageway of the housing and preventing fluid flow through the passageway and a second position different from the first and permitting fluid flow through the passageway, and the closure element is connected with the float for movement between the first and second positions.

3. A vent valve for fuel tanks and the like as defined in claim 2 wherein the closure element comprises a portion of the float.

4. A vent valve as defined in claim 2 wherein the pressure responsive actuating means includes a displaceable actuating rod movable into contact with the closure element in the first position and movable further to displace the closure element toward the second position in opposition to the buoyant forces on the float.

5. A vent valve for a fuel tank and the like as defined in claim 1 wherein the closure means includes a closure element mounted adjacent to the inlet of the fluid passageway in the housing.

6. A vent valve for fuel tanks and the like as defined in claim 1 wherein the pressure responsive actuating means comprises a bellows operatively associated with the closure means.

7. A vent valve as defined in claim 6 wherein the bellows is an elastomeric bellows mounted in sealed relationship on the valve housing.

8. In a tank receiving and dispensing a liquid and having a limited capacity, an integrated vent and pressure relief valve comprising:

a fluid conduit having a first end within the tank, a second end outside of the tank and a fluid passageway between the first and second ends for passage of fluids between the interior and exterior of the tank;

closure means including a float responsive to the liquid level within the tank and having a closure element movable from a first position in which the passageway in the fluid conduit is open and a second position in which the passageway is closed, the element being urged to move from the first to the second position to close the passageway by buoyant forces of the float in the tank as the liquid approaches a predetermined level; and pressure relief means responsive to pressure within the tank and operatively associated with the closure means for displacing the closure element from the second position and opening the fluid passageway in opposition to the buoyant forces of the float in liquid levels in the tank at or above the predetermined level and at internal tank pressures above a selected level.

9. In a tank, the integrated vent and pressure relief valve as defined in claim 8 wherein the pressure relief means comprises a bellows responsive to internal tank pressures.

10. In a tank, the integrated vent and pressure relief valve as defined in claim 9 wherein the bellows in response to pressures above the selected level mechanically engages the closure element in the second position and urges the closure element toward the first position in opposition to the float when the liquid is at or above the predetermined level in the tank.

11. In a tank, the integrated vent and relief valve of claim 9 wherein the bellows is mounted within the tank and is disengaged from the closure element at tank pressures below the selected level and liquid levels below the predetermined level.

12. In a tank, the integrated vent and relief valve of claim 10 wherein the closure element comprises a portion of the float.

13. In a tank, the integrated vent and relief valve as defined in claim 8 wherein the pressure relief means comprises a bellows mounted on the fluid conduit, and the closure means is also mounted on the conduit with the closure element operatively associated with the bellows within the fluid passageway.

14. The integrated vent and relief valve as defined in claim 13 wherein the bellows is an elastomeric bellows mounted in sealed relationship to the fluid conduit and exposed within the tank to pressure outside of the conduit.

15. The integrated vent and relief valve of claim 13 wherein the bellows mechanically engages the closure element to displace the element from the second position in opposition to the liquid in the tank at the predetermined level.

16. In a tank, the integrated vent and relief valve as defined in claim 8 wherein the closure element in the closure means comprises a portion of the float responsive to the liquid level in the tank, and the closure element cooperates with the first end of the fluid conduit to open and close the fluid passageway.

* * * * *